April 27, 1926.
G. H. GOLDSMITH
VEHICLE WHEEL
Filed Nov. 14, 1922
1,582,595
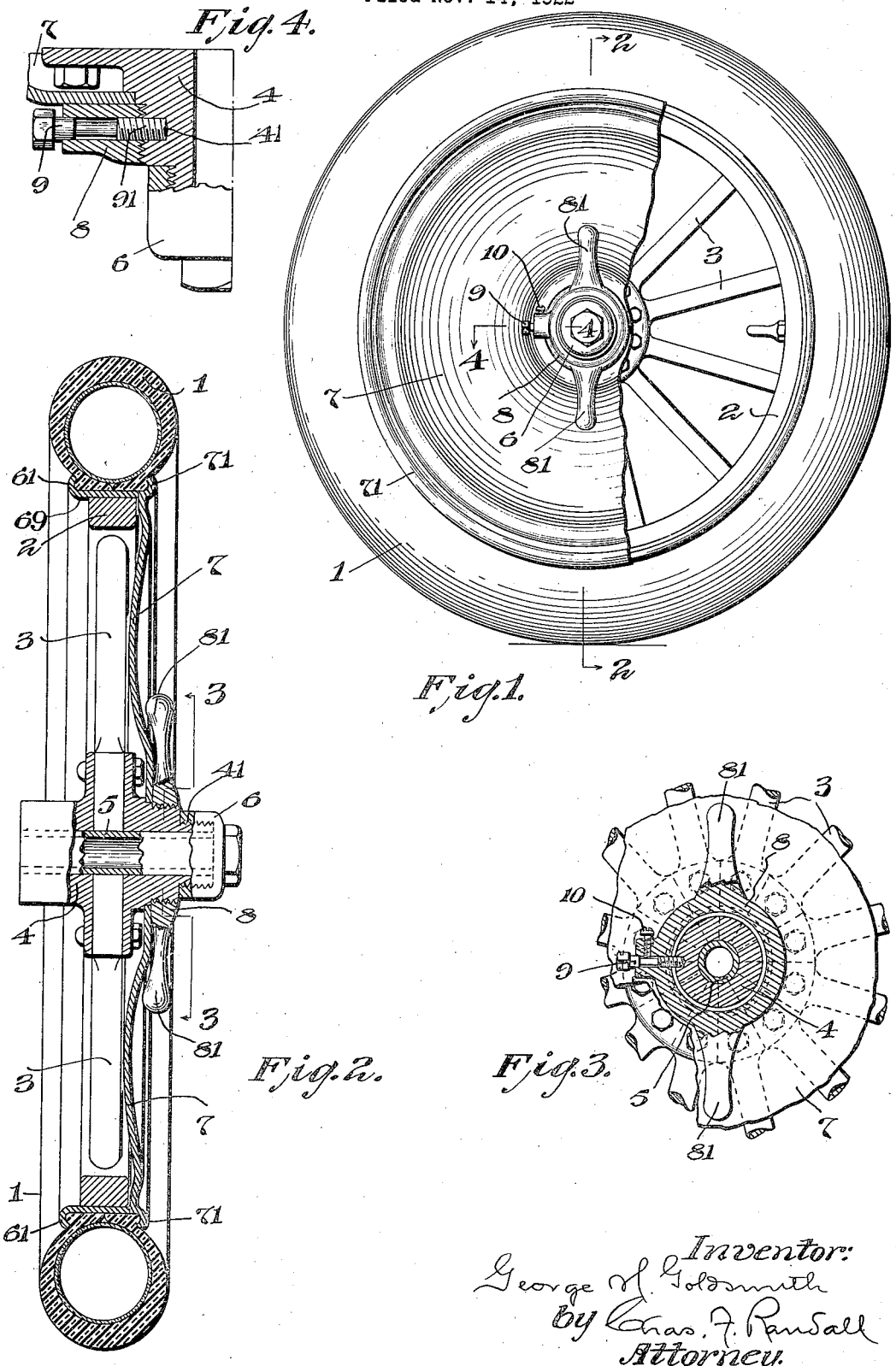
Inventor:
George H. Goldsmith
By Chas. F. Randall
Attorney.

Patented Apr. 27, 1926.

1,582,595

UNITED STATES PATENT OFFICE.

GEORGE H. GOLDSMITH, OF MELROSE, MASSACHUSETTS.

VEHICLE WHEEL.

Application filed November 14, 1922. Serial No. 600,852.

*To all whom it may concern:*

Be it known that I, GEORGE H. GOLDSMITH, a citizen of the United States, residing at Melrose, in the county of Middlesex, State of Massachusetts, have invented a certain new and useful Improvement in Vehicle Wheels, of which the following is a specification, reference being had therein to the accompanying drawings.

The invention comprises new and improved means for holding tires in place on the rims of wheels, such means providing in novel manner for facilitating the application of a tire to a wheel-rim, as well as for fastening it in working position, and for removal or change of tires.

In accordance with the invention I employ a laterally-engaging tire-holding member, and combine therewith and with the wheel-hub an annular member adapted to be placed, by manipulation, into position to hold the tire-holding member on the wheel-hub and cause it to perform its function, said manipulation being of a kind demanded by the correlated conformation (which may vary) of the wheel-hub and annular member, and I provide a locking device to prevent the annular member from working loose and out of proper position.

In the preferred embodiment of the invention I combine with the wheel-hub, and with a hub-cap removably attached thereto covering the outer end of the wheel-bearing, a single-flanged tire-holding rim forming with the laterally-engaging tire-holding member aforesaid the required channel for clinching or holding a tire upon the wheel, and I construct the annular member aforesaid to provide for removal thereof over the hub-cap without removal of the latter.

The accompanying drawings show an illustrative embodiment of the invention, which is the preferred embodiment aforesaid, Fig. 1 being a side elevation of a vehicle wheel having such embodiment incorporated therewith, a portion of the laterally-engaging tire-holding member being represented as broken away.

Fig. 2 is a view on a larger scale than Fig. 1, mainly in vertical section in the plane indicated by line 2, 2, in Fig. 1.

Fig. 3 is a view on the same scale as Fig. 2 showing the centrally-located parts of Figs. 1 and 2, partly in section on line 3, 3, of Fig. 2.

Fig. 4 is a sectional view on a still larger scale than Figs. 2 and 3, illustrating more particularly the locking means shown in Figs. 1 and 3 in connection with the annular member aforesaid.

Referring to the drawings,—

The showing of the tire 1, wheel-felloe 2, spokes 3, hub 4, central bearing 5, and hub-cap 6 screwed upon the threaded reduced outer end 41 of the hub may be regarded as wholly conventional. In practice, these parts respectively may be of any approved construction, and it is to be understood that although I have shown a simple sleeve or bushing 5 to serve as a central bearing member, ball bearing devices of any approved character and construction may be employed in practice.

At 69, Fig. 2, is represented a tire-holding rim, mounted upon the exterior of the wheel-felloe 2, and provided with the single outstanding flange 61 for engagement with one of the beads of tire 1. At 7 is a tire-holding member having its peripheral portion shaped to constitute a flange 71 which engages laterally with the opposite bead of the tire, the beaded portion of the tire being clasped between the two flanges 61, 71, and thereby held to its seat upon the rim 69. Thus the laterally-engaging tire-holding member 7 forms by its flange 71 in conjunction with the rim 69 and its single flange 61 the required channel for clinching or holding the tire upon the wheel.

The laterally-engaging tire-holding member 7 has a central eye or hole to admit the outer portion of the wheel-hub 4. When the said member is in working position its central portion encircles a portion of the hub adjacent the spoke-sockets at one side of a radial shoulder on the hub adapted to serve as a stop for limiting the movement of said central portion inward along the hub.

At 8 is an annular holding member such as aforesaid. When in its working position it surrounds an intermediate portion of the hub 4 between the laterally-engaging tire-holding member 7 and the hub-cap 6.

To enable the said annular member 8 to be placed, by manipulation, into position to hold the tire-holding member 7 on the wheel-hub and to put the member 7 in a state of tension causing its flange 71 to perform its tire-holding function, the member 8 is internally screwthreaded as shown in Fig. 2 to fit an external screw-thread that is formed upon the intermediate portion of the wheel-hub, on which it is mounted. This enables the said member 8 to be screwed inward for the purpose just mentioned, by taking hold of its radially projecting arms 81, 81. The screw-threading also provides for the unscrewing and removal of the annular member 8.

To permit the members 7 and 8 to be placed upon the hub or removed therefrom, as and when desired, without removal of hub-cap 6 being necessary, the seats for the said members upon the intermediate portion of the hub between the spokes and the hub-cap are larger in diameter than the exterior of the hubcap, and the central eyes or openings of such members consequently are made enough larger in diameter than the hub-cap to permit the two members to pass readily over the hub-cap, in being either applied to the hub or removed therefrom.

The locking device for preventing the annular member 8 from working loose and out of proper position is, in this embodiment of the features of the invention, a bolt 9 occupying a radial hole in said member, with the inner portion, 91, of its stem screw-threaded to fit the screw-threaded inner portion of the wall of said hole and also screw into and enter a threaded hole 41 in the hub 4, as shown in Figs. 3 and 4. When the inner end of the bolt occupies the hole 41 in hub 4, the annular member 8 cannot turn relative to the hub. Consequently, the annular member cannot work loose and out of proper position. When the bolt has been unscrewed so as to withdraw its inner end from hole 41 the annular member 8 may be turned upon the hub, as for the purpose of effecting its removal. To provide against the bolt 9 being unscrewed too far, the intermediate portion of its stem is reduced in diameter, producing shoulders upon the bolt spaced a short distance apart. A screw 10, Figs. 1 and 3, is entered into a threaded hole that is tapped in the projecting portion of hub 4 that is occupied by bolt 9, with the inner end of such screw projecting between the two shoulders of the bolt. Contact of the inner one of such shoulders with said end of screw 10 limits the extent to which the bolt 9 can be withdrawn.

From the foregoing it will be apparent that there are three main parts to my invention, consisting of; first, a single-flanged rim adapted to receive the tire and hold it concentrically on the wheel; second, a laterally-engaging tire-holding member constituted in the illustrative embodiment of the invention by a disk, the rim or periphery of which forms the second flange of the required channel in which the tire is clinched, or held; third, an annular member, in this embodiment a hand nut screwed and locked in position on a threaded portion of the wheel-hub, and removable independently of the hub-cap of the wheel, which nut holds the laterally-engaging tire-holding member firmly clinched against the tire.

This device is designed to be applied, with such formal modification as may be necessary by way of adaptation, to standard types of wheels in wide use to-day, to overcome certain faults in their manner of operation as to removal of tires. To apply my tire-holding devices, however, it is necessary to modify the peripheral portions of wheels to conform to the single-flanged rim mentioned above. Also, to provide a threaded or otherwise modified portion to the wheel-hub, greater in diameter than the hub-cap, to permit of screwing or otherwise manipulating the retaining hand nut in place. With these simple adaptations, most types of wheel construction used to-day may make use of the valuable advantages supplied by this means to change tires without the use of tools of any kind in the operation.

The invention is shown applied to a standard type of artillery wheel construction, made of wood and having the conventional number of spokes, but it may be applied to any form of wheel construction which can be adapted to receive it.

It will be noted that the invention is also designed to give any set of wheels to which it is applied the appearance of disk steel wheels, without actually involving the expense of adapting a disk steel wheel construction to existing bearings on the road car.

In order to explain the advantages which my tire-holding devices have over previously existing wheel construction, it is first desirable to explain some of the conspicuous faults in the prevailing wheel structures. The use of road cars, or automobiles is so universal at this date, that it is unnecessary to explain in great detail, all of the causes of annoyance, or the excessive work involved in changing tires on the road. It is also generally understood that, to avoid this work, and the annoyance of having to perform it, the custom has grown into widespread practice, of carrying a spare wheel, with extra tire already mounted on the rim. This is done because, previous to my invention, no form of tire-holding means has yet been devised, and demonstrated to involve less work in removing a tire from the wheel, than was necessary in removing the whole wheel, and replacing it with the spare wheel, having the extra tire mounted on it. This spare wheel replacement, however, involves the removal of a plurality of nuts, and much more work than that required to remove and replace a single hand-manipulated device such as the one supplied with my improvement.

In addition to the excessive work required to change a tire with previous forms of road construction, there is objection to the troublesome wear of tire-holding means incidental to the use of demountable rim wheels. The nuts on bolts holding the lugs of demountable rims need watching and tightening, inasmuch as they may wear loose, come off, and cause the rim to chafe in its fastenings, until the whole wheel may finally be loosened by this deterioration of the tire-holding means.

In all forms of tire-holding means, on wheel constructions previously reduced to practice, tools of some sort are required to remove a tire, and replace with a new one. In the case of the construction shown in the drawings no tools of any kind are required. That is a great advantage.

There is the additional advantage of enabling removal of the tire without disturbing the hub-cap, and allowing road dirt or other abrasive material to enter the bearing of the wheel, as would be likely to occur if the tire-holding means were held in place by a member which constituted, at the same time a hub-cap to cover the bearing.

What is claimed as the invention is:—

1. In a vehicle wheel, the combination with a wheel-hub, and a hub-cap removably attached thereto covering the outer end of the wheel-bearing, of a single-flanged tire-holding rim and a laterally-engaging tire-holding member, said rim and said member constituting tire-holding members forming in conjunction the required channel for clinching or holding a tire upon the wheel, and an annular member fastening removably to the said wheel-hub by manipulation, functioning in cooperation with said tire-holding members to hold the tire in working position on the wheel, and removable over the said hub-cap without removal of the latter, and means whereby said annular member is locked in place upon the wheel-hub.

2. In a vehicle wheel, the combination with a wheel-hub, and a hub-cap removably attached thereto covering the outer end of the wheel-bearing, of a single-flanged tire-holding rim and a laterally-engaging tire holding member, said rim and said member constituting tire-holding members forming in conjunction the required channel for clinching or holding a tire upon the wheel, an annular member adapted to pass on and off the wheel-hub over the hub-cap without removal of the latter, removably screwing upon the wheel-hub and cooperating with the tire-holding members, to hold the tire on the wheel, and means whereby said annular member is prevented from accidentally unscrewing from working relationship.

3. A vehicle wheel having combined with the wheel-hub a hub-cap, a single-flanged tire-holding rim, a laterally-engaging tire-holding member, said rim and said member constituting tire-holding members completing the tire-holding channel of the wheel, an annular member surrounding the wheel-hub, contiguous thereto, and cooperating with said tire-holding members in holding the tire in working position on the wheel, and a locking device independent of said hub-cap for preventing the annular member from working loose and out of proper position.

GEORGE H. GOLDSMITH.